United States Patent
Miyashita (10) Patent No.: US 6,323,784 B1
(45) Date of Patent: Nov. 27, 2001

(54) RADIO SELECTIVE CALL RECEIVER AND CHANNEL SELECTING METHOD THEREOF

(75) Inventor: Mafumi Miyashita, Shizuoka (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/185,330

(22) Filed: Nov. 3, 1998

(30) Foreign Application Priority Data

Mar. 11, 1997 (JP) .................................................. 9-316491

(51) Int. Cl.[7] ....................................................... G08B 5/22
(52) U.S. Cl. ................................. 340/825.44; 340/7.46; 340/825.2; 455/502; 455/524; 370/332; 370/333
(58) Field of Search ........................ 340/825.44, 825.47, 340/825.2, 7.2, 7.46; 455/439, 462, 465, 502, 524; 370/311, 315, 332, 333

(56) References Cited

U.S. PATENT DOCUMENTS

| 5,187,470 | 2/1993 | King et al. |
|---|---|---|
| 5,280,541 * | 1/1994 | Marko et al. ........................ 455/462 |
| 5,787,346 * | 7/1998 | Iseyama ................................ 455/439 |
| 5,793,756 * | 8/1998 | Ayerst et al. ........................ 370/311 |
| 5,875,179 * | 2/1999 | Tikalsky ............................... 370/315 |

FOREIGN PATENT DOCUMENTS

| 0 118 153 A1 | 9/1984 | (EP). |
|---|---|---|
| 0 593 027 A1 | 4/1994 | (EP). |
| 0 632 599 A1 | 1/1995 | (EP). |
| 6-315001 | 11/1994 | (JP). |
| WO 91/10300 | 7/1991 | (WO). |

* cited by examiner

*Primary Examiner*—Brian Zimmerman
*Assistant Examiner*—Yves Dalencourt
(74) *Attorney, Agent, or Firm*—Scully, Scott, Murphy & Presser

(57) ABSTRACT

In a radio selective call receiver, a reception channel is efficiently selected from a plurality of radio channels without unnecessary channel switch. When having lost synchronism with a first radio channel, the radio channels are scanned in a predetermined sequential order to search for a second radio channel with which synchronization is established. When the second radio channel has been found, it is again determined whether synchronization can be established with the first radio channel. When synchronization has been established with the first radio channel, the first radio channel is selected as the reception channel. When synchronization fails to be established with the first radio channel, the second radio channel is selected as the reception channel.

17 Claims, 6 Drawing Sheets

RADIO SELECTIVE CALL RECEIVER AND CHANNEL SELECTING METHOD THEREOF

BACKGROUND OF THE INVENTION

1. Field of the Invention

The present invention relates to a radio selective call receiver and, more particularly, to a method for automatically selecting a reception channel from a plurality of channels.

2. Description of the Related Art

There has been disclosed an example of a radio selective call receiver having the function of automatically switching a reception area in Japanese Patent Application Laid-Open Publication No. 6-315001. This conventional example is used in a system which is composed of a plurality of radio areas (small zones) each having a different frequency. When the state of the receiver comes out of synchronization with a selective calling signal, the sweep of the frequency channels is performed a prescribed number of times in accordance with a scan list. Then, when no synchronization signal has been detected, the operation of the radio system is stopped and, after the lapse of a prescribed time period, the sweep of the frequency channels is performed again.

However, in the above-described conventional radio selective call receiver, even when the channel condition has become temporarily deteriorated, the sweep of the frequency channels is performed in accordance with the scan list. Therefore, the possibility that the receiver will become synchronized with a channel different from the previous channel becomes high. For this reason, in a case where adjacent radio areas are overlapped, it results that a changeover or handover from one area to another frequently occurs. Therefore, when area changeover is not in time, there is the possibility that the failure to receive the selective calling signal will occur.

Further, the above-described radio selective call receiver employs a channel selection method to prevent the frequent occurrences of such area changeover. More specifically, when detecting the failure of synchronization with a current reception channel, it is determined whether this failure of synchronization with the reception channel has been repeatedly detected a prescribed number of times. If the synchronization with the reception channel was not successfully established after the repetition of the channel synchronization check, then the channel sweep is started in accordance with the scan list.

In this method, however, an unnecessary period of time for determining the synchronization of the last synchronized channel is needed and therefore the average time length needed for achieving a re-synchronization becomes long. As a result, the battery life becomes inconveniently short. Further, in a case where the status of the electric field becomes bad at the point in time when determining the synchronization of the last synchronized channel, the receiver becomes synchronized with an available channel that has been first detected. For this reason, there is the possibility that area changeover will frequently occur.

SUMMARY OF THE INVENTION

An object of the present invention is to provide a channel selecting method which enables efficient selection of a reception area without performing unnecessary changeover on the channels.

Another object of the present invention is to provide a radio selective call receiver which enables automatic selection of the channels with a lower power consumption.

According to an aspect of the present invention, a reception channel is selected from a plurality of radio channels in a radio selective call receiver as follows: a) when having lost synchronism with a first radio channel, scanning the radio channels in a predetermined sequential order to search for a second radio channel with which synchronization is established; b) when the second radio channel has been found, switching to the first radio channel to determine whether synchronization can be established with the first radio channel; c) when synchronization has been established with the first radio channel, selecting the first radio channel as the reception channel; and d) when synchronization fails to be established with the first radio channel, selecting the second radio channel as the reception channel.

As described above, it is again determined whether the previous sync established channel (the first radio channel) is now qualified for reception when switching to the second radio channel. If the first radio channel is available for sufficient reception, the first radio channel that was selected previously is again selected with making no channel change. Accordingly, it is possible to prevent execution of unnecessary area changeovers due to temporary deterioration in radio condition and to achieve an increase in the life of the battery and an increase in the efficiency with which the sync pull-in operation is performed.

According to another aspect of the present invention, a reception channel is selected from a plurality of radio channels as follows: a) when having lost synchronism with a first radio channel, scanning the radio channels in a predetermined sequential order to search for a second radio channel with which synchronization is established: b) when the second radio channel has been found, determining quality of the second radio channel; c) when the quality of the second radio channel has been determined, switching to the first radio channel to determine whether synchronization can be established with the first radio channel; d) when synchronization has been established with the first radio channel, determining quality of the first radio channel; and e) selecting one of the first radio channel and the second radio channel as the reception channel by comparing quality between the first radio channel and the second channel.

The step e) may be comprised of the steps of selecting the first radio channel as the reception channel when the quality of the first radio channel is not less than the quality of the second radio channel; and selecting the second radio channel as the reception channel when the quality of the first radio channel is less than the quality of the second radio channel.

Alternatively, the step e) may be comprised of the steps of relatively decreasing the quality of the second radio channel In a predetermined ratio with respect to the quality of the first radio channel to produce a decreased quality of the second radio channel; comparing the quality of the first radio channel to the decreased quality of the second radio channel; selecting the first radio channel as the reception channel when the quality of the first radio channel is not less than the decreased quality of the second radio channel; and selecting the second radio channel as the reception channel when the quality of the first radio channel is less than the decreased quality of the second radio channel.

When the second radio channel has been found through the channel scanning, the condition of the first radio channel that was a previously sync established channel is again checked. Therefore, under the circumstances wherein area changeover is properly needed, the area changeover can be performed smoothly.

Further, since the quality of the second radio channel is relatively decreased in a predetermined ratio with respect to the quality of the first radio channel and then the comparison is made, it is possible to prevent execution of unnecessary area changeovers due to temporary deterioration in radio condition and to achieve an increase in the life of the battery and an increase in the efficiency with which the sync pull-in operation is performed.

DETAILED DESCRIPTION OF THE PREFERRED EMBODIMENTS

Figure 1:
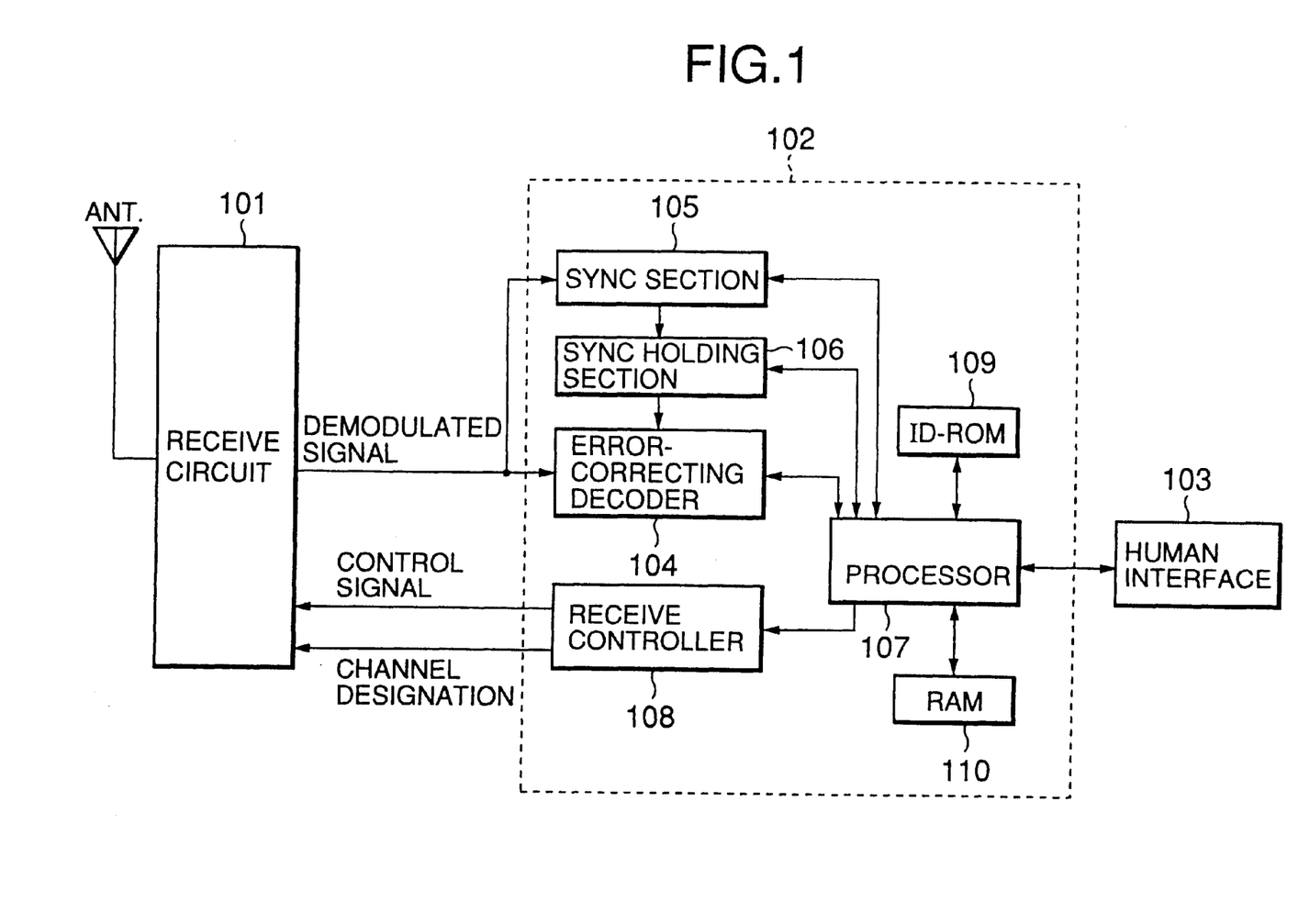
FIG. 1 is a block diagram illustrating a radio selective call receiver according to an embodiment of the present invention.

Referring to FIG. 1, a radio selective call receiver according to the present invention is comprised mainly of a receive circuit 101, control section 102 and human interface 103. The receive circuit 101 has a demodulator and a channel sweep circuit which can scan the reception channel frequencies. The channel sweep circuit may be constituted by a well-known phase-locked loop (PLL) circuit and can perform channel scanning according to a channel designation signal received from the control section 102. A radio signal that has been received by a designated channel is demodulated by the demodulator into a baseband signal and is output to the control section 102 as a demodulated signal.

The demodulated signal is input to an error-correcting decoder 104 and to synchronization section 105. The synchronization section 105 performs bit synchronization and detection of a predetermined synchronization signal. Further, the acquired synchronization is held by a sync holding section 106 and, in accordance therewith, the error-correcting decoder 104 decodes the demodulated signal into received data. The received data is output to a processor 107.

The processor 107 may be a program-controlled processor such as a microprocessor. The processor 107 performs processing of various kinds of signals and the receive control according to control programs stored in a program ROM not illustrated. Specifically, the processor 107 monitors the operations of the synchronization section 105 and sync holding section 106 to detect synchronization failure. The processor 107 further performs intermittent receive control of the receive circuit 101 through a receive controller 108. Further, it performs channel scanning control in accordance with a scan list and automatic area selection control as will be described later.

Furthermore, the processor 107 compares a selective calling number contained in the received data and an identification number stored in an ID-ROM 109 and thereby determines whether the received data is addressed to its own receiver. If the received data is addressed to this receiver itself, then the message data is stored in a message memory (RAM) 110 and the reception of message is notified to a user with a sound, light or the like and further the received message is displayed on screen by means of the human interface 103. The human interface 103 may includes a key pad, an alert device for notifying an incoming call to a user, a liquid crystal display for making display of a message and other necessary information.

FIRST EMBODIMENT

Figure 2:
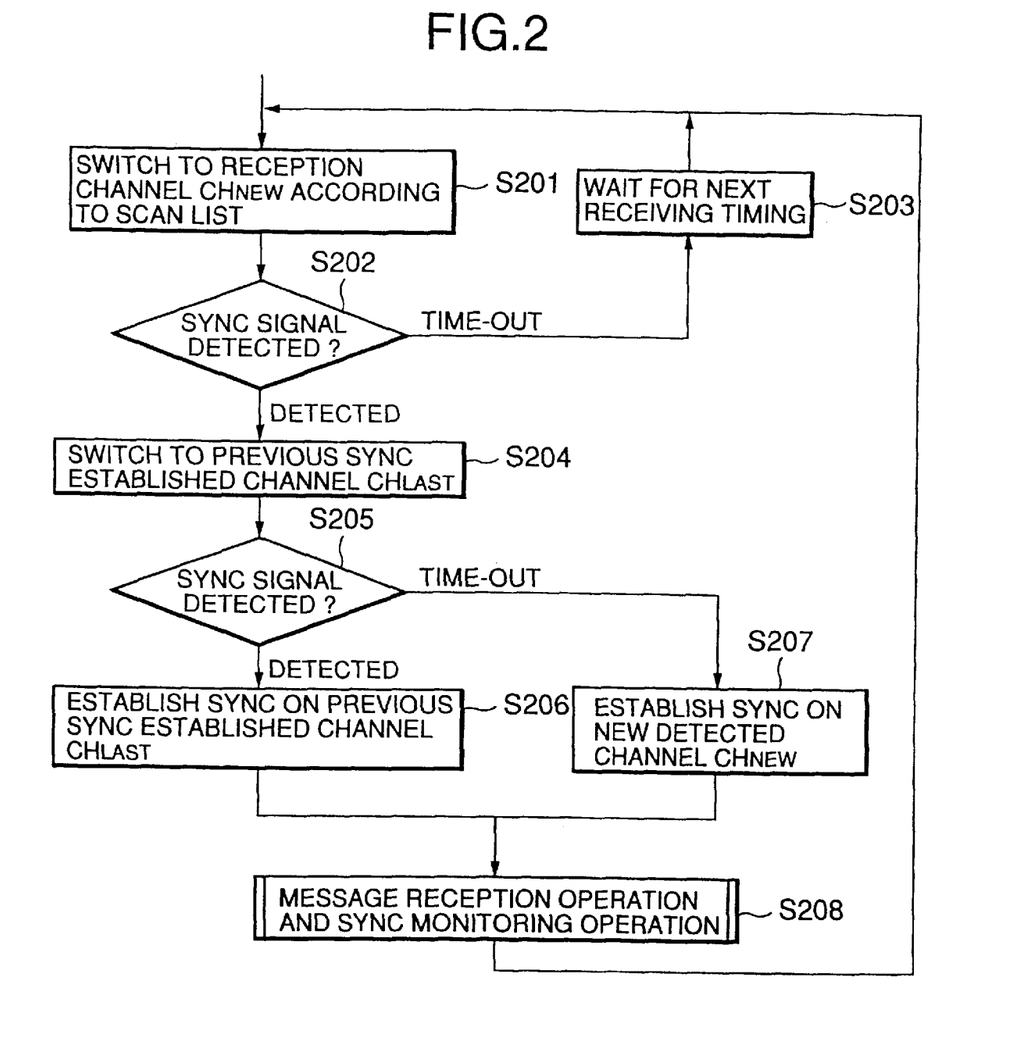
FIG. 2 is a flow chart illustrating a first embodiment of an automatic channel selecting method according to the present invention.

Referring to FIG. 2, when loss of synchronism is detected by the synchronization section 105 due to the movement of the user to outside the radio zone or to the temporary decrease in the reception intensity, the processor 107 stores therein the latest sync established channel $CH_{LAST}$ with which the receiver was synchronized. Thereafter, in order to search for an available channel with which the receiver is to be synchronized, the processor 107 performs the scanning of the channels in accordance with the predetermined scan list each time the intermittent receiving operation is performed.

More specifically, when performing the intermittent receiving operation, the received controller 108 outputs a channel designation signal to the receive circuit 101 in accordance with the scan list and thereby the receive circuit 101 switches to a new reception channel $CH_{NEW}$ (step S201). The processor 107 determines whether a synchronization signal is detected from a demodulated signal that has been received by the reception channel $CH_{NEW}$ (step S202). In a case where a prescribed monitoring period of time has lapsed without detecting the synchronization signal, that is, timeout occurs, the processor 107 waits until the timing of the next intermittent receiving operation comes (step S203). Thereafter, the steps 201 to 203 are repeatedly performed until the synchronization signal is detected.

When in step S202 the synchronization signal has been detected on a new reception channel $CH_{NEW}$, the processor 107 stores therein this newly detected reception channel $CH_{NEW}$. Thereafter, the receive circuit 101 is controlled by the receive controller 108 so as to switch to the previous sync established channel $CH_{LAST}$ (step S204) and then monitors the synchronization signal on this channel $CH_{LAST}$ (step S205).

When the synchronization signal has been detected on the previous sync established channel $CH_{LAST}$, the sync pull-in operation, i.e., sync establishing operation is performed with respect to this channel $CH_{LAST}$ (step S206). Contrarily, when in step S202 the prescribed monitoring period of time has lapsed without detecting the synchronization signal, the sync establishing operation is performed with respect to the newly detected channel $CH_{NEW}$ (step S207).

After the synchronization has been established in this way, the processor 107 performs not only the sync monitoring operation but other operations of storing the received message, notifying the reception to the user, displaying the received message, etc., as described above (step S208). When this synchronized state is lost due to the decrease in the reception intensity, the processor 107 returns the control operation to step S201 and thereby performs the above-described control steps.

Figure 3A:
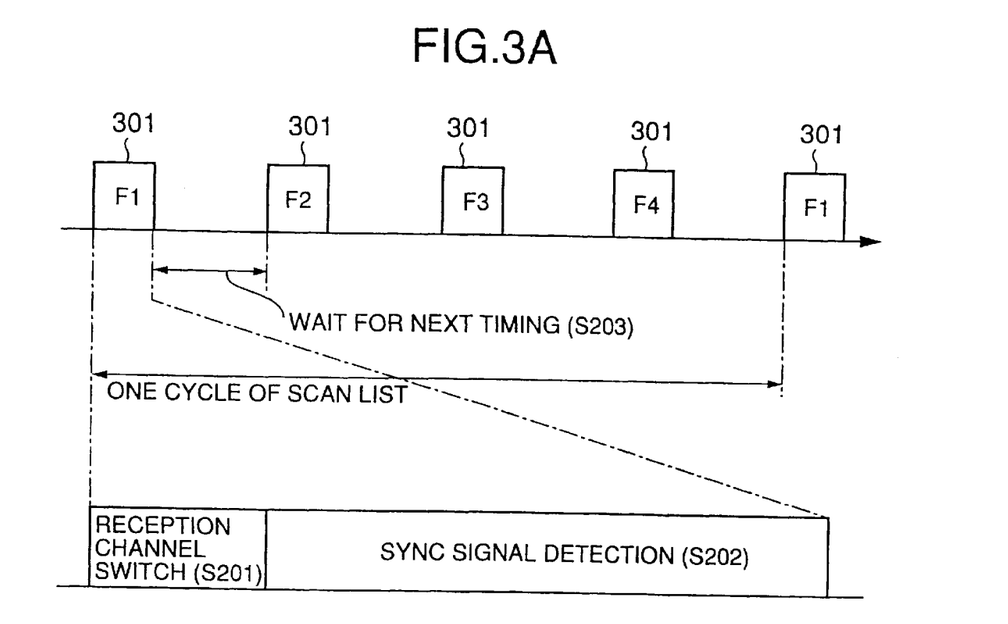
FIG. 3A is a time chart showing a channel searching operation of the first embodiment.

Referring to FIG. 3A, assuming that four channel frequencies F1 to F4 are preset and given as one cycle in the present order in the scan list. When loss of synchronization is detected, a first channel F1 is designated initially in accordance with the scan list and the channel determination operation 301 of determining whether the designated channel is available for reception is performed. Namely, the channel is switched to the reception channel F1 (step S201) and it is thereby determined whether the synchronization signal is detected from a demodulated signal that has been received by this channel (step S202). In a case where a prescribed monitoring period of time has lapsed without detecting the synchronization signal, wait is made until the timing of the next intermittent receiving operation (step S203). Thereafter, the reception channels F2 to F4 are sequentially designated in accordance with the scan list and similarly the channel determination operation 301 is performed for each channel until the synchronization signal is detected.

Figure 3B:
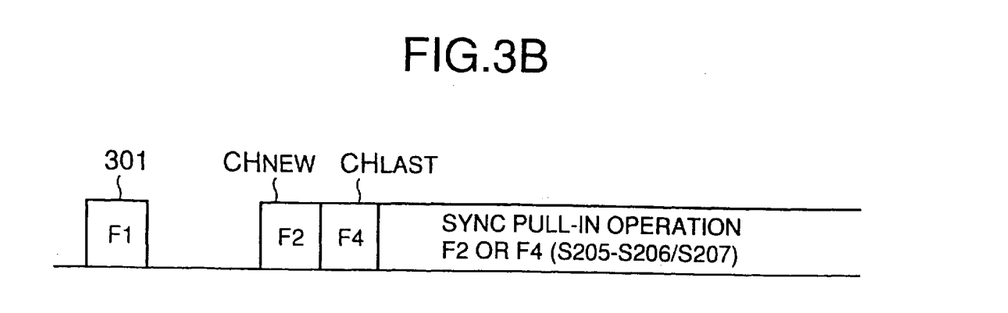
FIG. 3B is a time chart showing a channel searching operation of the first embodiment when an available channel is found.

As illustrated in FIG. 3B, it is assumed that the synchronization on the channel F4 has been lost and then the channel determination operation 301 is started in accordance with the scan list. In a case where the synchronization signal is not detected on the first channel F1, the subsequent channel F2 is designated as a new channel $CH_{NEW}$ to be subjected to the channel determination operation 301. If the synchronization signal is detected on the second channel F2, the channel F4 which is the previous sync established channel $CH_{LAST}$ is again designated and the channel determination operation 301 is performed thereon.

In a case where the synchronization signal has been detected on the previous sync established channel F4, no change is made of the reception channel and the sync pull-in operation is performed with respect to the previous sync established channel F4. When the synchronization signal fails to be detected on the previous sync established channel F4, the new channel F2 is designated and the sync pull-in operation is performed with respect to the channel F2.

SECOND EMBODIMENT

Figure 4:
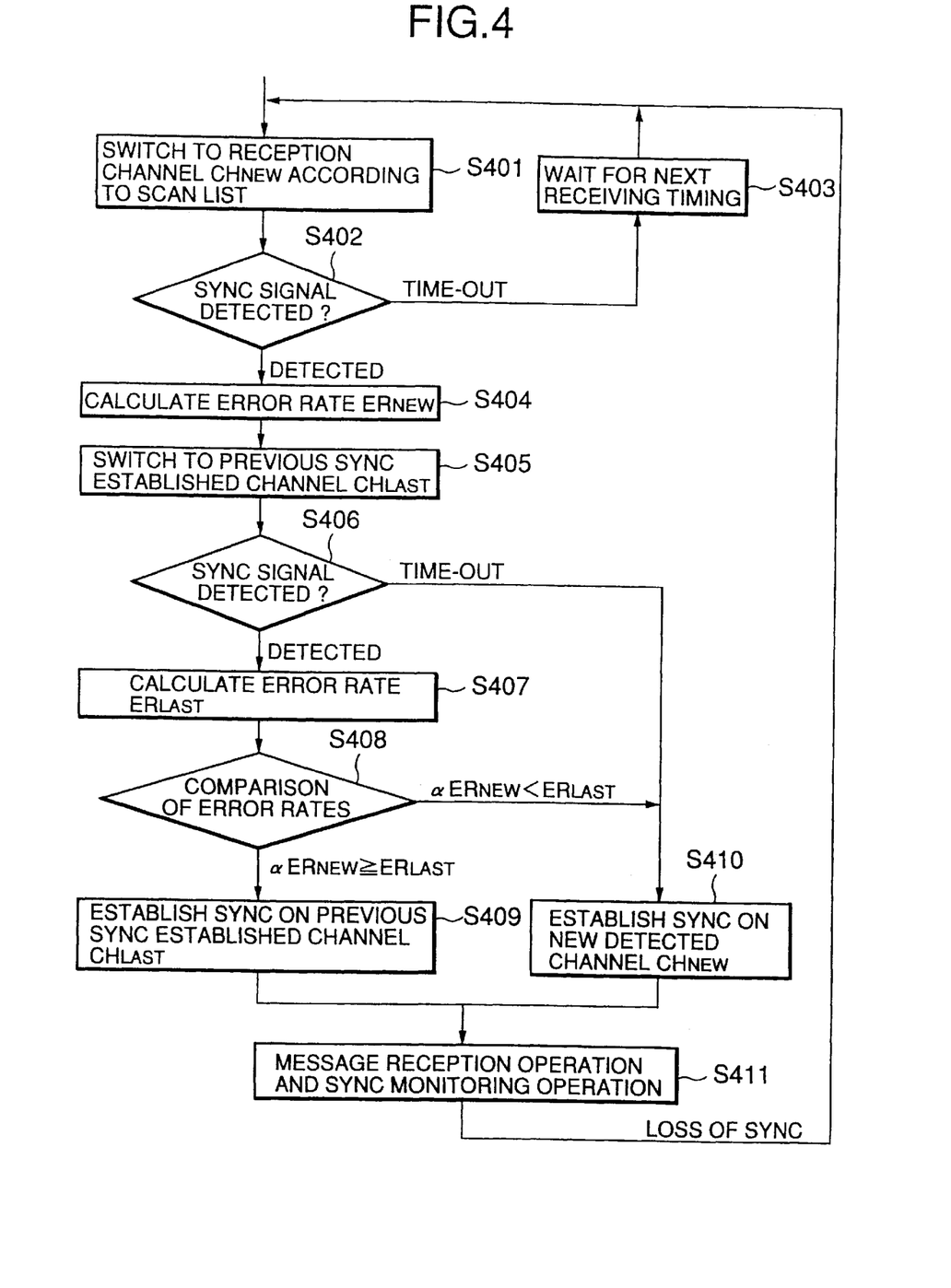
FIG. 4 is a flow chart illustrating a second embodiment of the automatic channel selecting method according to the present invention.

Referring to FIG. 4, there is shown a second embodiment of the automatic channel selecting method according to the present invention. The second embodiment is directed to making channel selection by taking the channel quality into consideration. Specifically, the error rate is calculated based on the error correcting operation by the error-correcting decoder 104 and the error rate is used as a basis for making channel selection. The second embodiment will hereinafter be described in detail.

When loss of synchronism is detected by the synchronization section 105 due to the movement of the user to outside the radio zone or to the temporary decrease in the reception intensity, the processor 107 stores therein the latest sync established channel $CH_{LAST}$ with which the receiver was synchronized. Thereafter, in order to search for an available channel with which the receiver is to be synchronized, the processor 107 performs the scanning of the channels in accordance with the predetermined scan list each time the intermittent receiving operation is performed.

More specifically, when performing the intermittent receiving operation, the received controller 108 outputs a channel designation signal to the receive circuit 101 in accordance with the scan list and thereby the receive circuit 101 switches to a new reception channel $CH_{NEW}$ (step S401). The processor 107 determines whether a synchronization signal is detected from a demodulated signal that has been received by the reception channel $CH_{NEW}$ (step S402). In a case where a prescribed monitoring period of time has lapsed without detecting the synchronization signal, that is, timeout occurs, the processor 107 waits until the timing of the next intermittent receiving operation comes (step S403). Thereafter, the steps 401 to 403 are repeatedly performed until the synchronization signal is detected.

When in step S402 the synchronization signal has been detected on a new reception channel $CH_{NEW}$, the processor 107 stores therein this newly detected reception channel $CH_{NEW}$ and calculates error rate $ER_{NEW}$ in the synchronization signal and error-correcting code during a prescribed period of time (step S404). Subsequently, the receive circuit 101 is controlled by the receive controller 108 so as to switch to the previous sync established channel $CH_{LAST}$ (step S405) and then monitors the synchronization signal on this channel $CH_{LAST}$ (step S406).

When the synchronization signal has been detected on the previous sync established channel $CH_{LAST}$, the processor 107 calculates error rate $ER_{LAST}$ in the synchronization signal and error-correcting code during a prescribed period of time (step S407). Then, the error rate $ER_{NEW}$ on the newly detected channel $CH_{NEW}$ is compared with the error rate $ER_{LAST}$ on the previous sync established channel $CH_{LAST}$ (step S408).

If the error rate $ER_{LAST}$ is not higher than the error rate $ER_{NEW}$ ($ER_{NEW} \geq ER_{LAST}$), the sync pull-in operation, i.e., sync establishing operation is performed with respect to this channel $CH_{LAST}$ (step S409). When in step S406 the prescribed monitoring period of time has lapsed without detecting the synchronization signal or when $ER_{NEW} < ER_{LAST}$, the sync establishing operation is performed with respect to the newly detected channel $CH_{NEW}$ (step S410).

After the synchronization has been established in this way, the processor 107 performs not only the sync monitoring operation but other operations of storing the received message, notifying the reception to the user, displaying the received message, etc., as described above (step S411). When this synchronized state is lost due to the decrease in the reception intensity, the processor 107 returns the control operation to step S401 and thereby performs the above-described control steps.

Another comparison method may be performed in the comparison step S408. In the case where $ER_{LAST}$ is slightly higher than $ER_{NEW}$, the newly detected channel $CH_{NEW}$ is not selected but the previous sync established channel $CH_{LAST}$. This causes the channel changing frequency to be further reduced. More specifically, assuming a constant α is greater than 1, the error rate $ER_{NEW}$ of the new detected channel $CH_{NEW}$ is weighted beforehand by the weight of α. If in step S408 $\alpha ER_{NEW} \geq ER_{LAST}$, the pull-in operation is performed on the previous sync established channel $CH_{LAST}$ (step S409). If $\alpha ER_{NEW} < ER_{LAST}$, the pull-in operation is performed on the newly detected channel $CH_{NEW}$ (step S410).

THIRD EMBODIMENT

Figure 5:
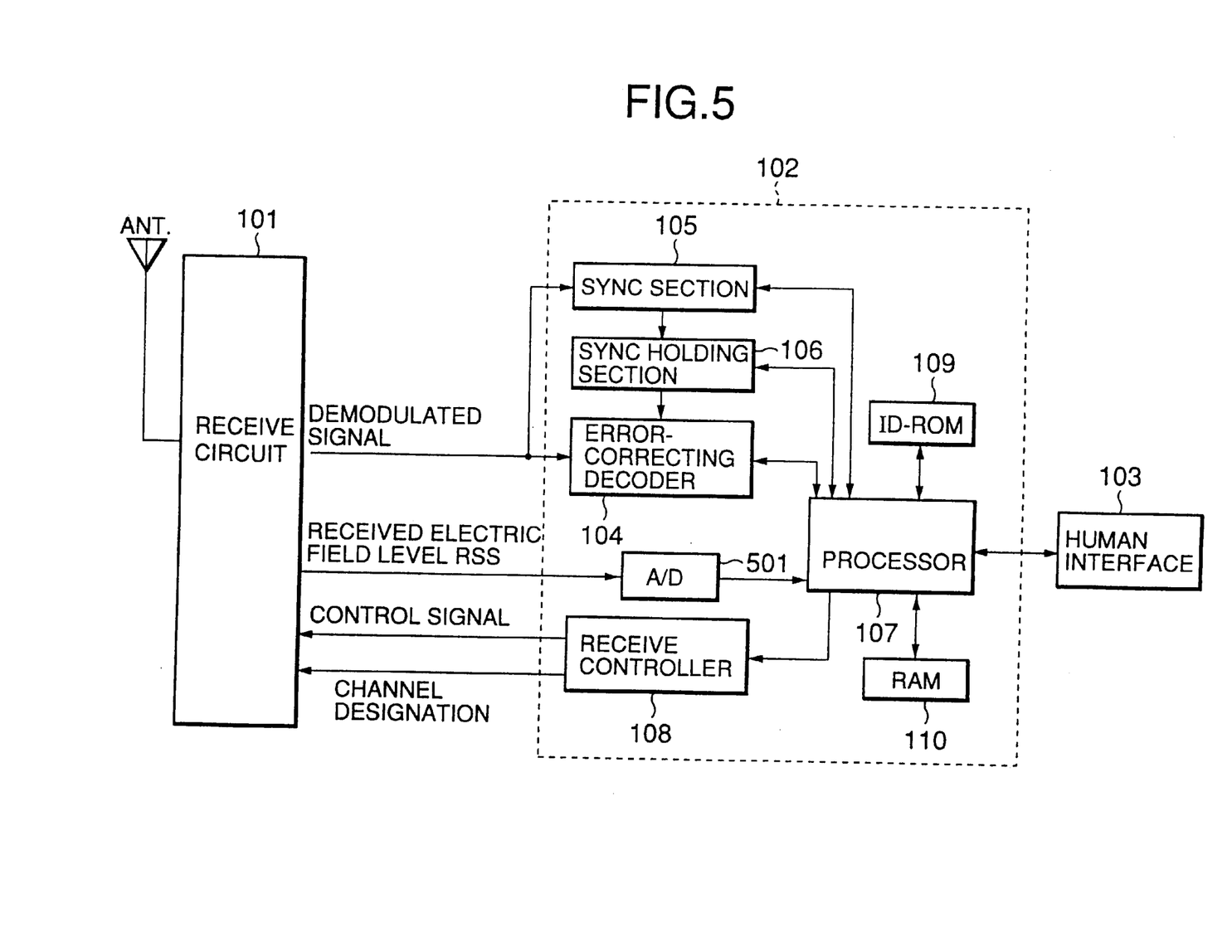
FIG. 5 is a block diagram illustrating a radio selective call receiver according to another embodiment of the present invention.

Referring to FIG. 5, there is shown a radio selective call receiver employing a channel selection method according to the third embodiment of the present invention. In this diagram, circuit blocks similar to those previously described with reference to FIG. 1 are denoted by the same reference numerals and the explanations thereof will be omitted.

The receive circuit 101 outputs a received electric field level RSS corresponding to the demodulated signal to the control section 102. The received electric field level RSS is converted to a digital signal by an analog/digital converter 501 and the digital electric field level RSS is used in the processor 107 as a basis for making channel selection, which will be described hereinafter.

Figure 6:
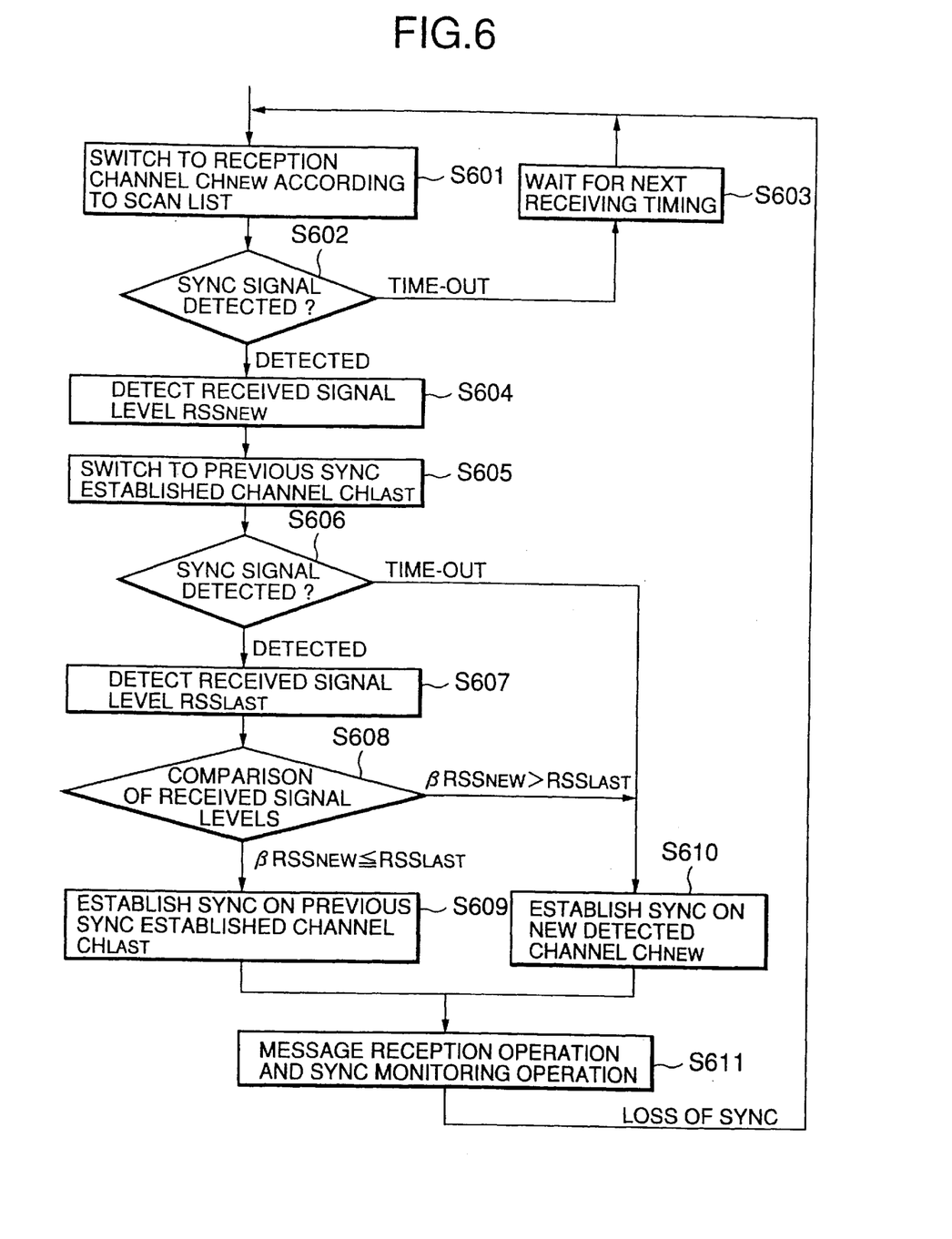
FIG. 6 is a flow chart illustrating a third embodiment of the automatic channel selecting method according to the present invention.

Referring to FIG. 6, there is shown the third embodiment of the automatic channel selecting method according to the present invention. The third embodiment is directed to making channel selection by taking the channel quality into consideration.

When loss of synchronism is detected by the synchronization section 105 due to the movement of the user to outside the radio zone or to the temporary decrease in the reception intensity, the processor 107 stores therein the latest sync established channel $CH_{LAST}$ with which the receiver was synchronized. Thereafter, in order to search for an available channel with which the receiver is to be synchronized, the processor 107 performs the scanning of the channels in accordance with the predetermined scan list each time the intermittent receiving operation is performed.

More specifically, when performing the intermittent receiving operation, the received controller 108 outputs a channel designation signal to the receive circuit 101 in accordance with the scan list and thereby the receive circuit 101 switches to a new reception channel $CH_{NEW}$ (step S601). The processor 107 determines whether a synchronization signal is detected from a demodulated signal that has been received by the reception channel $CH_{NEW}$ (step S602). In a case where a prescribed monitoring period of time has elapsed without detecting the synchronization signal, that is, timeout occurs, the processor 107 waits until the timing of the next intermittent receiving operation comes (step S603). Thereafter, the steps 601 to 603 are repeatedly performed until the synchronization signal is detected.

When in step S602 the synchronization signal has been detected on a new reception channel $CH_{NEW}$, the processor 107 stores therein this newly detected reception channel $CH_{NEW}$ and inputs the received signal level $RSS_{NEW}$ thereof from the receive circuit 101 through the A/D converter 501 (step S604). Subsequently, the receive circuit 101 is controlled by the receive controller 108 so as to switch to the previous sync established channel $CH_{LAST}$ (step S605) and then monitors the synchronization signal on this channel $CH_{LAST}$ (step S606).

When the synchronization signal has been detected on the previous sync established channel $CH_{LAST}$, the processor 107 inputs the received signal level $RSS_{LAST}$ thereof from the receive circuit 101 through the A/D converter 501 (step S707). Then, the received signal level $RSS_{NEW}$ of the newly detected channel $CH_{NEW}$ is compared with the received signal level $RSS_{LAST}$ of the previous sync established channel $CH_{LAST}$ (step S608).

If the received signal level $RSS_{LAST}$ is not lower than the received signal level $RSS_{NEW}$ ($RSS_{NEW} \leq RSS_{LAST}$), the sync pull-in operation, i.e., sync establishing operation is performed with respect to this channel $CH_{LAST}$ (step S609). When in step S606 the prescribed monitoring period of time has lapsed without detecting the synchronization signal or when $RSS_{NEW} > RSS_{LAST}$, the sync establishing operation is performed with respect to the newly detected channel $CH_{NEW}$ (step S610).

After the synchronization has been established in this way, the processor 107 performs not only the sync monitoring operation but other operations of storing the received message, notifying the reception to the user, displaying the received message, etc., as described above (step S611). When this synchronized state is lost due to the decrease in the reception intensity, the processor 107 returns the control operation to step S601 and thereby performs the above-described control steps Another comparison method may be performed in the comparison step S608. In the case where $RSS_{LAST}$ is slightly lower than $RSS_{NEW}$, the newly detected channel $CH_{NEW}$ is not selected but the previous sync established channel $CH_{LAST}$. This causes the channel changing frequency to be further reduced. More specifically, assuming a constant β is smaller than 1, the received signal level $RSS_{NEW}$ of the new detected channel $CH_{NEW}$ is weighted beforehand by the weight of β. If in step S608 $\beta RSS_{NEW} \leq RSS_{LAST}$, the pull-in operation is performed on the previous sync established channel $CH_{LAST}$ (step S609). If $\beta RSS_{NEW} > RSS_{LAST}$, the pull-in operation is performed on the newly detected channel $CH_{NEW}$ (step S610).

As has been described above, according to the present invention, when switching the reception channel, it is again determined whether the previous sync established channel is now qualified for reception. And, if this previous sync established channel is available for sufficient reception, the same channel as the previous channel is selected with making no channel change. Accordingly, it is possible to prevent execution of unnecessary area changeovers due to temporary deterioration in radio condition and to achieve an increase in the life of the battery and an increase in the efficiency with which the sync pull-in operation is performed.

Further, when an available reception channel is found through the channel scanning, the condition of the previous sync established channel is again checked. Therefore, under the circumstances wherein area changeover is properly needed, the area changeover can be performed smoothly.

What is claimed is:

1. A method for selecting a reception channel from a plurality of radio channels in a radio selective calling receiver to minimize unnecessary channel changeovers, comprising the steps of:
    a) noting loss of synchronization with a first radio channel;
    b) scanning the radio channels in a predetermined sequential order to search for a second radio channel with which synchronization can be established;
    c) synchronizing to the second radio channel;
    d) switching to the first radio channel to determine whether synchronization can be established with the first radio channel;
    e) selecting the first radio channel as the reception channel if synchronization has been established with the first radio channel; and
    f) selecting the second radio channel as the reception channel if synchronization fails to be established with the first radio channel.

2. The method according to claim 1, wherein it is determined that synchronization is established with a radio channel when a synchronization signal has been detected from a selective calling signal on the radio channel.

3. The method according to claim 1, wherein, in the step a), the radio channels are scanned in a predetermined sequential order at predetermined intervals.

4. A method for selecting a reception channel from a plurality of radio channels in a radio selective call receiver to minimize unnecessary channel changeovers, comprising the steps of:
    a) noting loss of synchronization with a first radio channel;
    b) scanning the radio channels in a predetermined sequential order to search for a second radio channel with which synchronization can be established;
    c) synchronizing to the second radio channel;

d) determining quality of the second radio channel;

e) switching to the first radio channel to determine whether synchronization can be established with the first radio channel;

f) synchronizing to the first radio channel if synchronization can be established with the first radio channel g) determining quality of the first radio channel if synchronization has been established with the first radio channel;

h) comparing quality between the first radio channel and the second radio channel; and i) selecting one of the first radio channel and the second radio channel as the reception channel based on the results of comparing quality between the first radio channel and the second radio channel.

5. The method according to claim 4, wherein the step e) comprises the steps of:

selecting the first radio channel as the reception channel when the quality of the first radio channel is not less than the quality of the second radio channel; and selecting the second radio channel as the reception channel when the quality of the first radio channel is less than the quality of the second radio channel.

6. The method according to claim 4, wherein the step e) comprises the steps of:

relatively decreasing the quality of the second radio channel in a predetermined ratio with respect to the quality of the first radio channel to produce a decreased quality of the second radio channel;

comparing the quality of the first radio channel to the decreased quality of the second radio channel;

selecting the first radio channel as the reception channel when the quality of the first radio channel is not less than the decreased quality of the second radio channel; and selecting the second radio channel as the reception channel when the quality of the first radio channel is less than the decreased quality of the second radio channel.

7. The method according to claim 4, wherein the quality is represented by an error rate and the step e) comprises:

selecting the first radio channel as the reception channel when the error rate of the first radio channel is not greater than the error rate of the second radio channel; and selecting the second radio channel as the reception channel when the error rate of the first radio channel is greater than the error rate of the second radio channel.

8. The method according to claim 4, wherein the quality is represented by an error rate, and the step e) comprises the steps of:

relatively increasing the error rate of the second radio channel in a predetermined ratio to produce an increased error rate of the second radio channel;

comparing the error rate of the first radio channel to the increased error rate of the second radio channel;

selecting the first radio channel as the reception channel when the error rate of the first radio channel is not greater than the increased error rate of the second radio channel; and selecting the second radio channel as the reception channel when the error rate of the first radio channel is greater than the increased error rate of the second radio channel.

9. The method according to claim 4, wherein the quality is represented by a received signal level, and the step e) comprises:

selecting the first radio channel as the reception channel when the received signal level of the first radio channel is not smaller than the received signal level of the second radio channel; and selecting the second radio channel as the reception channel when the received signal level of the first radio channel is smaller than the received signal level of the second radio channel.

10. The method according to claim 4, wherein the quality is represented by a received signal level, and the step e) comprises the steps of:

relatively decreasing the received signal level of the second radio channel in a predetermined ratio to produce a decreased received signal level of the second radio channel;

comparing the received signal level of the first radio channel to the decreased received signal level of the second radio channel;

selecting the first radio channel as the reception channel when the received signal level of the first radio channel is not smaller than the decreased received signal level of the second radio channel; and selecting the second radio channel as the reception channel when the received signal level of the first radio channel is smaller than the decreased received signal level of the second radio channel.

11. The method according to claim 4, wherein, in the step a), the radio channels are scanned in a predetermined sequential order at predetermined intervals.

12. A radio selective call receiver operable at a plurality of radio channels, comprising:

a receiving circuit for receiving a radio selective calling signal on a reception channel selected from the radio channels to produce a baseband signal;

a determiner for determining whether synchronization is established with the reception channel;

a controller performing channel selection control such that when having lost synchronism with a first radio channel, the radio channels are scanned in a predetermined sequential order to search for a second radio channel with which synchronization is established, that when the second radio channel has been found, the channel is switched to the first radio channel to determine whether synchronization can be established with the first radio channel, that when synchronization has been established with the first radio channel, the first radio channel is selected as the reception channel, and that when synchronization fails to be established with the first radio channel, the second radio channel is selected as the reception channel.

13. The radio selective call receiver according to claim 12, wherein the controller controls the receiving circuit such that the radio selective calling signal is intermittently received at predetermined intervals and, when having lost synchronism with a first radio channel, the radio channels are scanned in the predetermined sequential order at the predetermined intervals.

14. A radio selective call receiver operable at a plurality of radio channels, comprising:

a receiving circuit for receiving a radio selective calling signal on a reception channel selected from the radio channels to produce a baseband signal;

a first determiner for determining whether synchronization is established with the reception channel;

a second determiner for determining quality of a radio channel;

a controller performing channel selection control such that when having lost synchronism with a first radio channel, the radio channels are scanned in a predetermined sequential order to search for a second radio channel with which synchronization is established, that when the second radio channel has been found, the second determiner determines quality of the second radio channel is determined, that when the quality of the second radio channel has been determined, the receiving circuit switches to the first radio channel to determine whether synchronization can be established with the first radio channel, that when synchronization has been established with the first radio channel, the second determiner determines quality of the first radio channel, and that one of the first radio channel and the second radio channel is selected as the reception channel by comparing quality between the first radio channel and the second channel.

15. The radio selective call receiver according to claim 14, wherein the controller performs the channel selection control such that the first radio channel is selected as the reception channel when the quality of the first radio channel is not less than the quality of the second radio channel, and the second radio channel is selected as the reception channel when the quality of the first radio channel is less than the quality of the second radio channel.

16. The radio selective call receiver according to claim 14, wherein the controller performs the channel selection control such that the quality of the second radio channel is relatively decreased in a predetermined ratio with respect to the quality of the first radio channel to produce a decreased quality of the second radio channel, the quality of the first radio channel is compared to the decreased quality of the second radio channel, the first radio channel is selected as the reception channel when the quality of the first radio channel is not less than the decreased quality of the second radio channel, and the second radio channel is selected as the reception channel when the quality of the first radio channel is less than the decreased quality of the second radio channel.

17. The radio selective call receiver according to claim 14, wherein the controller controls the receiving circuit such that the radio selective calling signal is intermittently received at predetermined intervals and, when having lost synchronism with a first radio channel, the radio channels are scanned in the predetermined sequential order at the predetermined intervals.

* * * * *

UNITED STATES PATENT AND TRADEMARK OFFICE
CERTIFICATE OF CORRECTION

PATENT NO. : 6,323,784 B1
DATED : November 27, 2001
INVENTOR(S) : M. Miyashita

Page 1 of 1

It is certified that error appears in the above-identified patent and that said Letters Patent is hereby corrected as shown below:

<u>Title page,</u>
Item [30], Foreign Application Priority Data,
"Mar. 11, 1997" should read -- Nov. 3, 1997 --

Signed and Sealed this

Twenty-eighth Day of May, 2002

*Attest:*

*Attesting Officer*

JAMES E. ROGAN
*Director of the United States Patent and Trademark Office*